(12) United States Patent
Bierschenk et al.

(10) Patent No.: US 6,338,606 B1
(45) Date of Patent: Jan. 15, 2002

(54) METHOD AND APPARATUS FOR STACKING TORTILLA CHIPS

(75) Inventors: Patrick J. Bierschenk, Dallas; Steven D. Braithwaite, Allen; John J. Michels, Highland Village, all of TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/326,682

(22) Filed: Jun. 7, 1999

(51) Int. Cl.⁷ .............................................. B65G 57/16
(52) U.S. Cl. ................... 414/788.2; 414/788.9; 414/798.4; 198/360; 198/406
(58) Field of Search ................... 198/360, 406, 198/452, 462.2; 414/798.4, 798.5, 788.2, 788.9

(56) References Cited

U.S. PATENT DOCUMENTS

| | | | |
|---|---|---|---|
| 2,831,564 A | | 4/1958 | Pavesi |
| 3,677,391 A | * | 7/1972 | Schaeffer ...................... 198/35 |
| 3,802,154 A | * | 4/1974 | Dillon .......................... 53/154 |
| 4,054,015 A | * | 10/1977 | Rowell .......................... 53/26 |
| 4,105,108 A | | 8/1978 | Lauer |
| 4,546,870 A | | 10/1985 | Cogo |
| 4,555,892 A | * | 12/1985 | Dijkman ...................... 53/142 |
| 4,978,548 A | * | 12/1990 | Cope et al. .................. 426/439 |
| 5,863,177 A | * | 1/1999 | Carson et al. ........... 414/798.9 |
| 5,873,448 A | * | 2/1999 | Tsai et al. .................... 198/360 |
| 5,941,365 A | * | 8/1999 | Ritter .......................... 198/380 |
| 6,053,695 A | * | 4/2000 | Longoria et al. ........ 414/790.8 |

* cited by examiner

*Primary Examiner*—Joseph A. Fischetti
(74) *Attorney, Agent, or Firm*—Rothwell Figg Ernst & Manbeck (57) ABSTRACT

A method and apparatus for stacking curved, triangular snack food chips, e.g., tortilla chips, for packaging in a sleeve-type container. The chips are fed into a first, U-shaped vibratory chute, which automatically causes the apex corners of the chips to extend beyond the opposing base edges of adjacent chips and which automatically orients the chips such that lines about which they are curved are oriented parallel to the longitudinal direction of the U-shaped chute. The chips are then fed into a W-shaped chute, with the chips facing in opposite directions falling automatically into opposite troughs of the W-shaped chute. The chips are then automatically reoriented by 120° such that their upturned apex corners point in the direction of travel, and the chips are stacked automatically as they slide up along one another in a shingled manner.

10 Claims, 6 Drawing Sheets

METHOD AND APPARATUS FOR STACKING TORTILLA CHIPS

FIELD OF THE INVENTION

The present invention relates generally to a method and apparatus for processing snack food chips. More particularly, the invention relates to a method and apparatus for stacking curved tortilla chips in a uniform stack which then can be packaged neatly and compactly, e.g., in a cylindrical can or other sleeve-type container.

BACKGROUND OF THE INVENTION

Tortilla chips are one of the more popular types of snack food products and have come to be associated with having a triangular shape. Additionally, snack food chips which are used for dipping, e.g., potato chips, tortilla chips, or corn chips, preferably are curved to enhance the scooping ability of the chip as well as to add strength to the chip.

With respect to packaging, a stacked arrangement of snack food chips has been found to be popular. The typical triangular shape of a tortilla chip, however—particularly a curved tortilla chip—previously has prevented tortilla chips from being packaged in a stacked arrangement in an efficient, automatic process.

SUMMARY OF THE INVENTION

The present invention provides a method and apparatus for automatically arranging curved, triangular snack food chips such as tortilla chips in a neat, compact, stacked arrangement which is suitable for packaging the chips in a cylindrical can or other sleeve-type package. According to the invention, the chips are transported along a vibrating U-shaped chute, oriented in an alternating arrangement. The vibrating U-shaped chute automatically ensures both proper orientation and positioning of the chips in that the chips slide laterally such that their centers of gravity are at the bottom of the chute and such that base edges of the triangular chips are oriented parallel to the longitudinal axis of the U-shaped chute. The chips then fall into a W-shaped vibrating chute, with the chips originally having one orientation automatically being caused to fall into the trough constituting one half of the W-shaped chute and the chips having the opposite orientation automatically being caused to fall into the other trough constituting the other half of the W-shaped chute.

The chips then travel along the W-shaped chute by sliding along their base edges, i.e., with their opposite, upturned apices pointing perpendicular to the direction of travel of the chips. The tortilla chips are then caused to rotate by 120° such that the upturned apices "lead" as the chips continue to progress. This configuration permits the chips to slide into nested, stacked relationship automatically, in which arrangement the chips can be packaged easily in a stacked configuration.

Thus, in a first aspect, the invention features a method of stacking curved, generally triangular tortilla chips for subsequent packaging, e.g., in a sleeve-type package. The method entails transporting a succession of the chips along a direction of travel, and while transporting the chips, causing them to be oriented such that their apex corners point in the direction of travel. The chips are then caused to become stacked automatically by virtue of the apex corner of one chip sliding up and over the base edge of the preceding chip in the succession such that they come into a stacked, nested arrangement automatically.

In preferred embodiments, the chips are oriented properly by sliding down a J-slide from one conveyor to another. Alternatively, the chips can be allowed to tumble over the end of the first conveyor onto the second conveyor.

In another aspect, the invention features a method of segregating the chips into separate lines or successions of chips based on the direction in which the chips point (as indicated by their upturned, apex corners). The method entails transporting the chips in a given direction of travel and causing the chips to be oriented such that the line about which each is curved is substantially parallel to the direction of travel. The chips are also caused to move laterally, relative to the direction of travel, such that their centers of gravity become generally aligned. (This may be done simultaneously with the step of causing the chips to be oriented such that their lines of curvature are substantially parallel.) At this point, the straight base edges of the chips pointing in one direction will all be aligned, and the straight base edges of the chips pointing in the opposite direction will all be aligned, and the apex corners of the chips pointing in one direction will extend laterally beyond the base edges of the chips facing in the opposite direction and vice-versa. The chips are then segregated into two separate conveyor troughs by being tripped or partially flipped by means of their apex corners into the troughs, with the chips pointing in one direction going to one conveyor trough and the chips pointing in the other direction going to the other conveyor trough.

In preferred embodiments, the chips are both oriented and caused to move laterally simultaneously by transporting them along the bottom of a vibrating U-shaped chute, the radius of curvature of which preferably matches the radius of curvature of the chips. Additionally, the conveyor troughs are provided by means of a W-shaped chute, and the chips are tripped or partially flipped into one side of the "W" or the other.

In combination, these two aspects provide a method of segregating and stacking curved, generally triangular chips such as tortilla chips.

In another aspect, the invention features an apparatus for segregating and stacking for subsequent packaging a succession of curved, generally triangular chips. The apparatus features a first, vibratory, generally U-shaped conveyor chute which feeds into a second, generally W-shaped conveyor chute. The W-shaped conveyor chute has means for rotating the chips by about 120°, and the apparatus includes two accumulator conveyors which receive chips from the W-shaped conveyor chute and which automatically accumulate and stack the chips in a nested, stacked arrangement.

In preferred embodiments, the first, U-shaped conveyor chute includes a pair of fingers extending from its downstream end, and the fingers are positioned above the two troughs of the second, W-shaped conveyor chute to trip or flip the chips into one trough or the other depending on the orientation of the chips. Additionally the W-shaped chute preferably is vibratory, as are the accumulator conveyors. The means for rotating the chips can be J-slides which transfer the chips from the troughs of the W-shaped chute to the accumulator conveyors or, alternatively, the chips can be allowed to tumble over the edge of the end of the W-shaped chute onto the accumulator conveyors.

By employing the various inventive concepts disclosed herein, it is possible to produce curved, triangular chips such as tortilla chips in alternating directions (which is the most efficient way to make tortilla chips) and then stack them automatically, conveniently, and reliably to be packaged in a popular sleeve-type container.

BRIEF DESCRIPTION OF THE DRAWINGS

The invention will now be described in greater detail in connection with the drawings, in which.

DETAILED DESCRIPTION OF PREFERRED EMBODIMENTS

Figure 1:
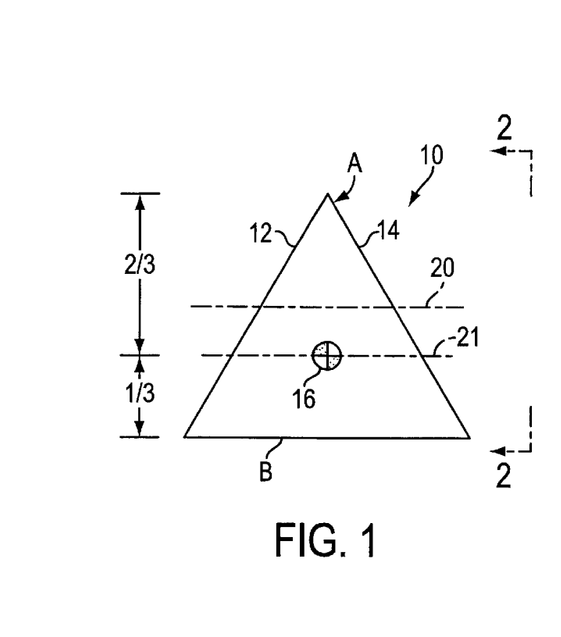
FIGS. 1 and 2 are a plan view and a side view, respectively, of a curved, triangular tortilla chip to be packaged using the method and apparatus of the invention.
Figure 2:
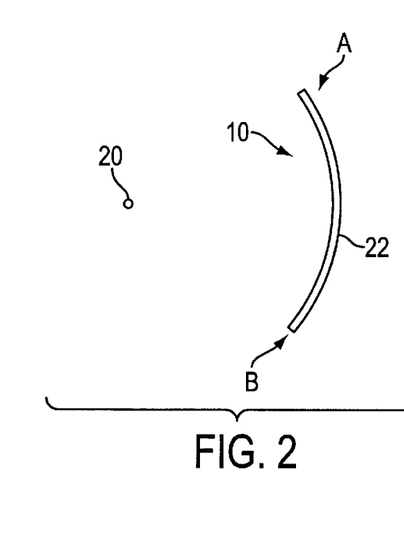

As shown in FIG. 1, a tortilla chip 10 customarily has an equilateral triangular shape. Moreover, as shown in FIG. 2, tortilla chips preferably have a certain amount of curvature, which can be imparted to the chips by frying or baking in a curved mold. It will be appreciated that the two edges of the triangle 12 and 14 will be curved, whereas the opposite, "included" edge will be straight. For purposes of describing the invention, the straight edge will be referred to as the base edge B, and the opposite corner of the triangle will be referred to as the apex A.

Furthermore, it will be appreciated that because the chip is an equilateral triangle, its center of gravity 16 will be located one-third of the distance between the base and the apex. Additionally, assuming the tortilla chip has a circular arc of curvature, it will be curved about a line or axis of curvature 20. With this configuration and nomenclature, it will be understood that if one were to lay one of the curved tortilla chips on a table, it could rock on its "back" surface 22 (FIG. 2), and if one were to press the base edge B down against the table, the apex A would be upturned.

In general, because of their triangular shape, tortilla chips can be (and generally are) cut from a dough sheet in an alternating pattern, i.e., with the apex corners facing in alternating directions. (As a result, there is no "lace" between successive tortilla chips, and this helps to reduce wasted dough.) With the invention, tortilla chips so produced can be kept in such an alternating arrangement, which looks like the four leftmost chips shown in FIG. 3, as the chips are transferred out of their cooking molds.

After they are cooked, the curved, triangular tortilla chips 10 are transferred from their molds to a generally U-shaped, vibrating chute 30 (FIG. 3), the upstream end 32 of which is slightly higher than the downstream end 34. Preferably, the radius of curvature of the inner, concave surface 36 of the U-shaped chute matches the radius of curvature of the convex, "back" surface 22 of the tortilla chips 10. The tortilla chips may be transferred from the cooking apparatus into the U-shaped chute 30 either automatically or by hand, whichever is more convenient. If transferred automatically, the chips will be arranged relatively uniformly, as are the four leftmost chips shown in FIG. 3; if, on the other hand, the chips are transferred to the chute by hand, they will tend to be oriented and positioned somewhat more randomly, as are the middle two chips shown in FIG. 3. Regardless of how the chips are transferred to the U-shaped chute 30, the invention has been found to work quite well.

Figure 3:
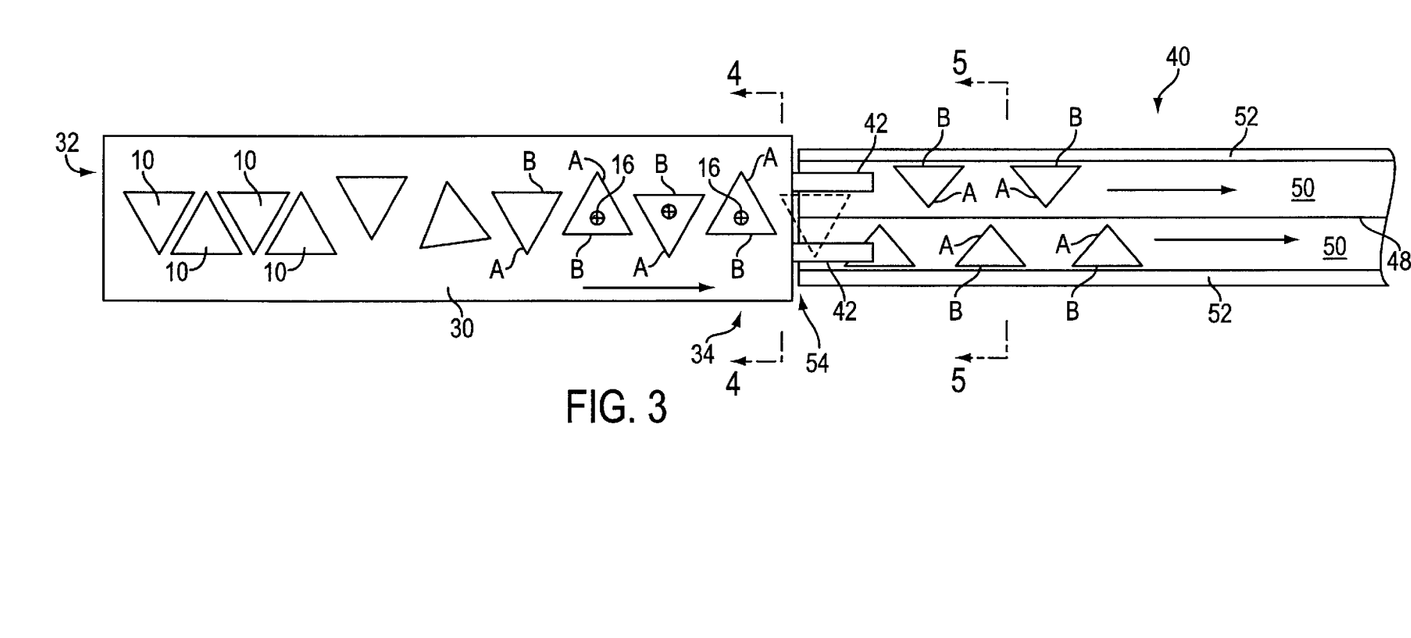
FIG. 3 is a plan view of the upstream portion and part of the middle portion of the apparatus of the invention.
Figure 4:
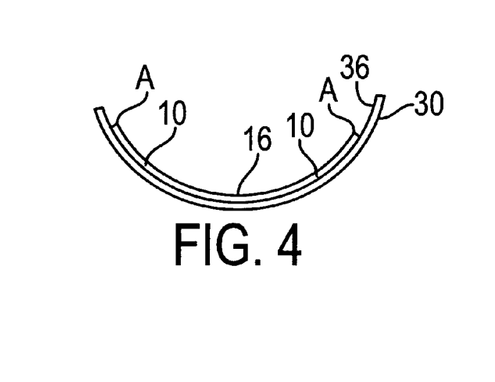
FIGS. 4 and 5 are section views of the apparatus shown in FIG. 3 taken along the lines 4—4 and 5—5, respectively.

As the U-shaped chute vibrates, the tortilla chips will move downstream, from left to right as shown in FIG. 3, because the upstream end 32 is located slightly higher than the downstream end 34. Moreover, because the center of gravity of each chip is closer to the base edge B than it is to the apex A, the chips will slide transversely relative to the longitudinal axis of the U-shaped chute such that their centers of gravity move to the bottom of the chute, as illustrated at the right end of the U-shaped chute in FIGS. 3 and 4. This causes a lateral or transverse "segregation" of the chips such that the apices A of the chips are laterally offset relative to the base edges B of adjacent chips, as shown at the downstream end 34 of the U-shaped chute. Moreover, because the curvature of the U-shaped chute preferably matches the curvature of the tortilla chips, the tortilla chips also will orient themselves automatically such that the base edges B are aligned substantially parallel to the longitudinal axis of the U-shaped chute 30, i.e., with the line 21 (FIG. 1) passing through the center of gravity 16 and parallel to the base edge of the chip aligned over and extending along the bottom of the trough 30. This feature is particularly advantageous when the chips are loaded into the chute 30 in a manner which does not result in them being as aligned as might be desired, e.g., by hand.

Figure 5:
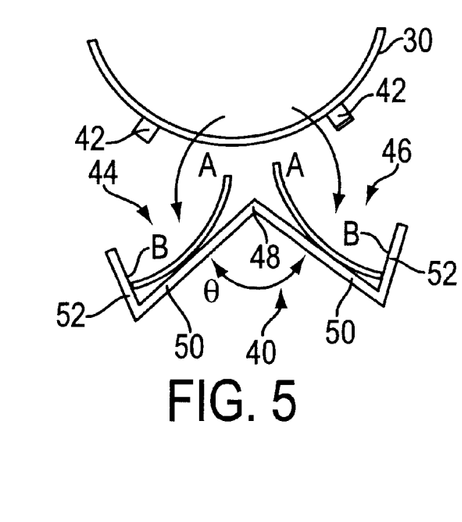

After they are laterally segregated and properly oriented, the tortilla chips drop from the U-shaped chute 30 into a W-shaped chute 40. As shown in FIGS. 3 and 5, a pair of fingers 42 extend slightly from the downstream end of the U-shaped chute over the two troughs 44, 46 which are formed by the two halves of the W-shaped chute 40. As shown in FIG. 5, the fingers 42 are attached to the convex, undersurface of the U-shaped chute, e.g. by welding, and they are laterally spaced such that the apices of the laterally separated tortilla chips "hang up" on the fingers as the chips slide off of the downstream end 34 of the U-shaped chute and drop into the W-shaped chute 40, as illustrated by the chip shown in dashed lines in FIG. 3. As a result, the chips are "flipped" slightly over the vertex 48 of the W-shaped chute, and they automatically fall alternatingly into the opposite troughs 44 and 46. Thus, all chips having their apices facing in one direction fall into one of the troughs, and all chips having their apices facing in the opposite direction fall into the other trough. The chips slide down along the slanted inner walls 50 of the W-shaped chute, and their base edges B butt up against the sidewalls 52 with the apices positioned near the vertex 48 of the W-shaped chute. See FIG. 5.

Figure 3A:
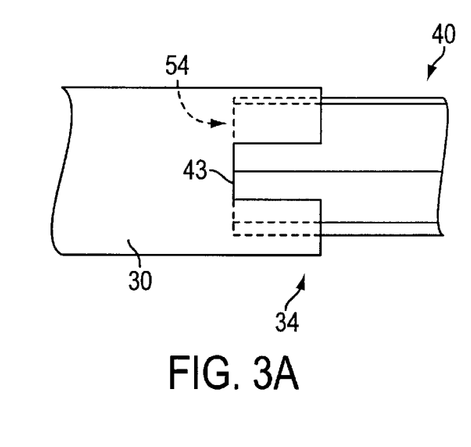
FIG. 3a is a plan view of the relevant portion of an alternative configuration thereof.

As an alternative to the fingers 42, the U-shaped chute may simply have a rectangular notch 43 cut out of the downstream end of it, as shown in FIG. 3a. In that case, the U-shaped chute, per se, would extend slightly over the upstream end 54 of the W-shaped chute 40.

Figures 6, 8:
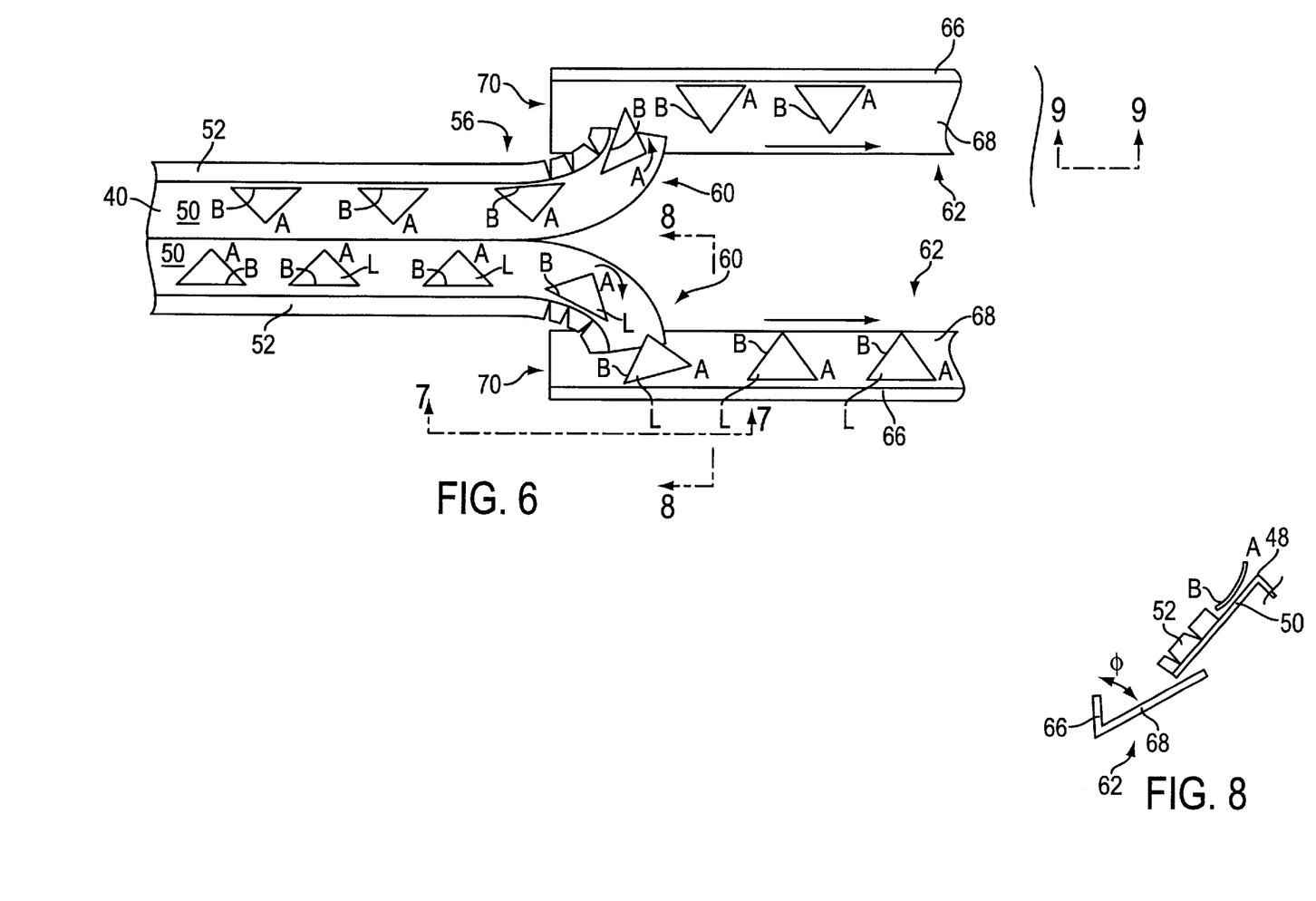
FIG. 6 is a plan view of the downstream end of the middle portion of the apparatus of the invention where it joins the upstream end of the downstream-most portion of the apparatus of the invention.
FIGS. 7 and 8 are a side view and an end view, respectively, taken along the lines 7—7 and 8—8, respectively, in FIG. 6 and showing the J-slide used to transfer the tortilla chips from the middle portion to the end portion of the apparatus of the invention and simultaneously to re-orient them.

Like the U-shaped chute 30, the W-shaped chute 40 vibrates, and its upstream end 54 (see FIG. 3) is elevated slightly relative to its downstream end 56 (see FIG. 6). Accordingly, the tortilla chips slide along the slanted inner walls 50 from left to right as shown in FIGS. 3 and 6. Because the tortilla chips are oriented with their apices pointing up, however, such that they move transverse relative to the direction in which the apices "point", they can not be stacked automatically at this point.

As I have discovered, part of the key to being able to stack curved triangular tortilla chips automatically is to orient them such that the apices "lead" as the chips travel downstream. Accordingly, it is necessary to rotate the tortilla chips 120° relative to the orientation they have in the W-shaped chute. This is accomplished easily, effectively, and reliably by means of the structure illustrated in FIGS. 6–8.

In particular, at its downstream end 56, the W-shaped chute splits, and each trough thereof terminates in a J-slide 60 which leads the tortilla chips to generally straight (i.e., longitudinally extending), V-shaped vibratory accumulator conveyors 62. As the chips reach the downstream end of the W-shaped chute, they slide down the J-slides 60 onto the accumulator conveyors 62.

The tortilla chips slide down the J-slides with their base edges B against the sidewalls 52 of the W-shaped chute 40 and, as illustrated, they rotate as they slide down. This results in the tortilla chips landing against upstanding guide walls 66 of the accumulator conveyors 62 with what had been their "leading" corners L (FIG. 6) striking the guide walls first, but with the tortilla chips now rotated by approximately 90°. As the tortilla chips slide all the way down along the slanted support walls 68 and come to rest against the guide walls 66, they continue to rotate about the previously leading corners L and come to rest against the guide walls 66 with their apices A now rotated 120° forward (relative to the direction of travel of the chips). Thus, the apices A now point in the direction in which the chips are traveling.

Figure 7:
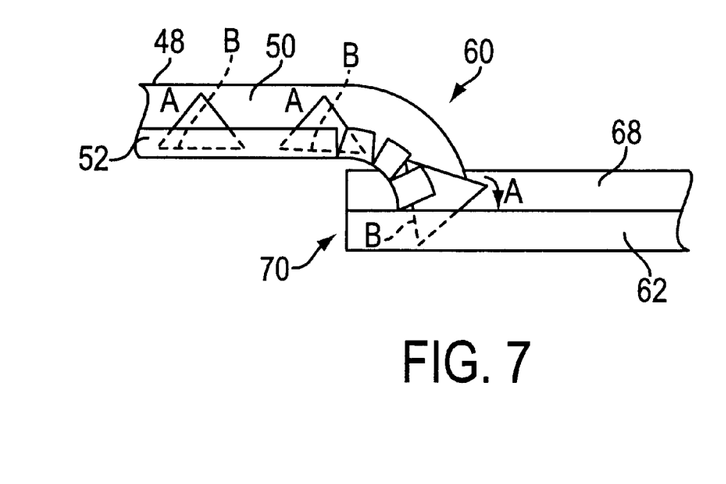
Figure 9:
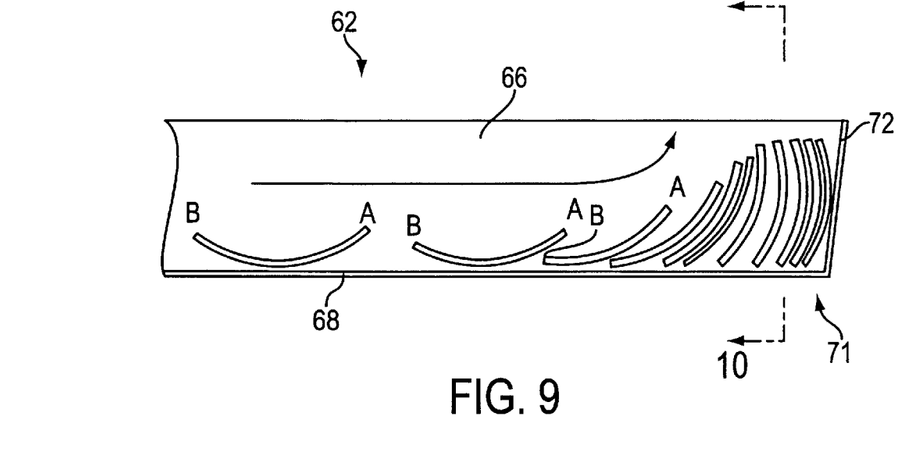
FIG. 9 is an "edge-on" side view illustrating the endmost portion of the apparatus of the invention, at which point the tortilla chips are automatically being stacked.

Because the upstream ends 70 of the accumulator conveyors 62 (see FIG. 6) are slightly higher than the downstream ends 71 (see FIG. 9), the tortilla chips will move from left to right as shown in FIGS. 6, 7, and 9 as the accumulator conveyors vibrate. As shown in FIG. 9—which is an "edge-on" view looking straight down along the slanted support wall 68 of the top accumulator conveyor of the two shown in FIG. 6 (as indicated by the arrows 9—9) and showing the accumulation of tortilla chips at the downstream end thereof—the tortilla chips move along the slanted support wall 68 of each accumulator conveyor until they reach end wall 72 at the downstream end 71 of the accumulator conveyor.

Because the apices, which are now leading, are upturned, the first tortilla chip to reach the end wall 72 will slide up along the end wall 72 such that it is resting on its base edge B with its apex A pointing up. As the next tortilla chip slides into the first tortilla chip, because its apex corner A is upturned, it will slide into and up along the concave, front surface of the tortilla chip in front of it and it, too, will come to stand on its base edge B. In this manner, all of the tortilla chips automatically will "shingle" themselves and slide into a nested, stacked arrangement, as shown at the downstream end 71 of the accumulator conveyor 62.

In addition to re-orienting the tortilla chips by 120° such that their apices lead as the chips travel along the accumulator conveyors 62, it is also key to the success of my invention to maintain this orientation; the V-shaped construction and orientation of the accumulator conveyors ensures that this requirement is met. In particular, because the support walls 68 are slanted relative to horizontal as seen in section in FIG. 8 (in addition to being slanted slightly relative to horizontal from the upstream end of the accumulator conveyor to the downstream end), the tortilla chips will slide down along them until they come to rest against the upstanding guide walls 66 (which define the V-shaped cross-section in conjunction with the support walls 68) with the curved edges extending between the previously leading corners L and the apices A (see FIG. 6) resting flush against the guide walls 66. (The chips are shown in FIG. 6 as spaced slightly from the guide walls 66; this is for clarity only.) Because the edges rest flush against the guide walls 66 and the weight of the chips keeps them there, the tortilla chips are unable to spin or rotate as they vibrate along the length of the accumulator conveyors and the required, apex-first orientation necessary for automatic stacking is ensured. (Were the vibratory accumulator conveyors simply flat sheets, the curved or upturned shape of the tortilla chips would make them particularly prone to spinning because, in that case, the chips would make contact with the conveyors only along the line of tangency between their convex back surfaces 22 (FIG. 2) and the conveyors.)

Figure 10:
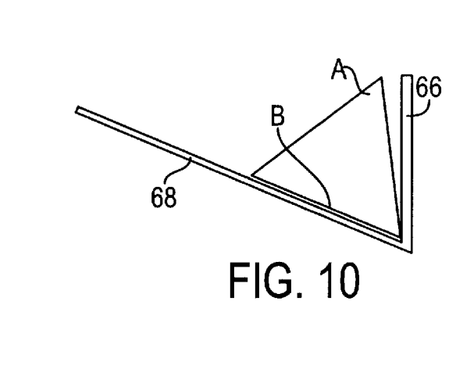
FIG. 10 is a section view illustrating the endmost portion of the apparatus as shown in FIG. 9, taken along the line 10—10 therein.

Preferably, the angle φ between the guide walls 66 and the support walls 68 (see FIG. 8) is on the order of 65°, i.e., slightly larger than the corner angles of the tortilla chips. (See FIG. 10.) This angle helps to maintain the proper orientation for the chips to "shingle up" on themselves, and because the angle is only slightly wider than the corner angle of the tortilla chips, it keeps the chips aligned and oriented properly for subsequent packaging while at the same time allowing a slight amount of "play," which is important to prevent chip breakage.

Once an appropriate amount of tortilla chips have been so stacked, they are packaged by suitable packaging means (not shown), e.g., an apparatus which can load the tortilla chips into a cylindrical can or other sleeve-type container. As an additional benefit of the invention, the tortilla chips once again will automatically start to shingle themselves into proper stacked arrangement for further packaging—without the need for operator intervention—after the process has been interrupted for such packaging (or for some other reason). This is in contrast to other automatic food product stackers, such as cracker stackers, which require an operator to intercede and re-start the stacking process every (or nearly every) time it is interrupted.

It will be appreciated that one may depart from the embodiment of the inventive method and apparatus discussed above without departing from the scope and spirit of the invention. For example, it will be observed from FIG. 6 that the overall width of the conveying line approximately doubles when the line transitions from the W-shaped chute to the two accumulator conveyors. On a commercial scale set-up of the invention, it is contemplated that there could be as many as thirty-six to forty-eight such lines; accordingly, the amount of floor space taken up by the accumulators could be large.

Figure 11:
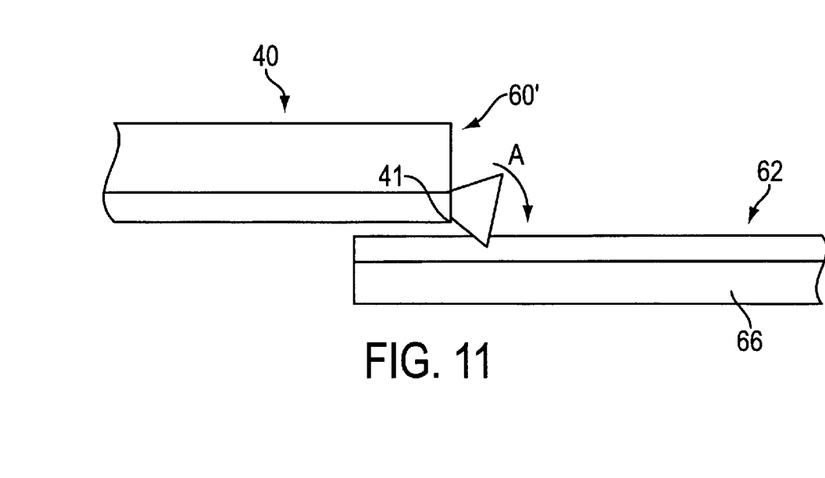
FIGS. 11 and 12 are side views, analogous to FIG. 7, showing alternate embodiments of the apparatus of the invention.

To conserve floor space, rather than J-slides 60, the downstream end of the W-shaped chute could terminate abruptly, as shown in FIG. 11. In that case, the tortilla chips would simply be permitted to rotate by 120° as they tumble over the downstream-most bottom edge 41 of the W-shaped chute and onto the accumulator conveyor 62. If this approach is used, it is recommended that the angle θ between the inner slanted walls 50 of the W-shaped chute (see FIG. 5) be decreased such that the chips assume more of an upright, standing-on-end configuration to ensure that they spin around their centers of gravity as they fall off the end of the W-shaped chute.

Figure 12:
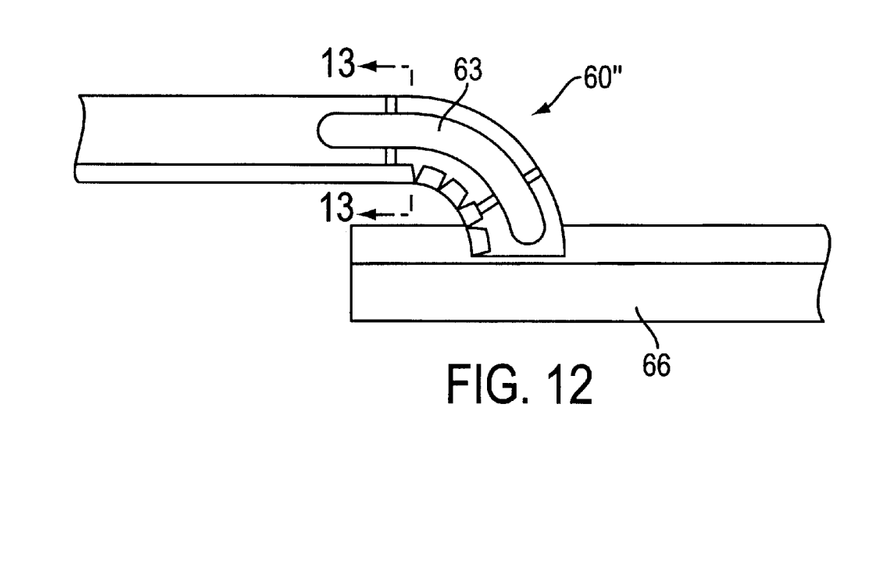
Figure 13:
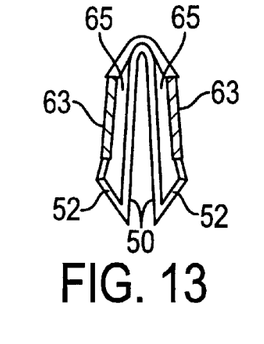
FIG. 13 is a section view taken along the lines 13—13 in FIG. 12.

If one desired more control over the tumbling chips but still wished to achieve the space savings of the embodiment shown in FIG. 11, one could maintain the J-slides at the downstream end of the W-shaped chute but decrease the angle θ to approximately 5° to 10° such that the tortilla chips are standing straight up as they enter the J-slide portion. In that case, as illustrated in FIGS. 12 and 13, it is suggested that retaining tongues 63 be fastened in place, spaced slightly from the inner slanted walls 50 of the W-shaped chute, to form a narrow gap or passageway 65 through which the chips slide down onto the accumulator conveyors and to prevent the chips from falling off of the W-shaped chute by tumbling over the side walls 52.

Moreover, although the invention has been described and illustrated above using a tortilla chip production run in which the tortilla chips enter the U-shaped chute 32 in alternating fashion, i.e., with the apices of the tortilla chips pointing toward one side of the U-shaped chute and then the other in alternating fashion, this is not necessary for obtaining the benefit of the invention. For example, the tortilla chips could be stacked after passing through a seasoning apparatus in which they are relatively spread out, and the seasoning apparatus would then feed the tortilla chips onto the U-shaped chute 30. In that case, it will be appreciated that the chips will have a rather random orientation pattern in the chute. Alternatively, it is conceivable that tortilla chips could be fed into the U-shaped chute 30 with just a single orientation, i.e., with all apex corners A facing the same direction. In that case, all chips would fall into the same trough 44 or 46 of the W-shaped chute and would be stacked on a single accumulator conveyor.

Other modifications likely will occur to those having skill in the art and are deemed to be within the scope of the following claims.

We claim:

1. A method of stacking curved, generally triangular chips for subsequent packaging, each of the chips being curved about a line extending parallel to a first, base of the chip and having an upturned apex corner opposite the base edge, said method comprising the steps:

transporting a succession of said chips in a direction of travel;

while transporting the chips, causing them to be oriented such that the apex corners point in the direction of travel;

maintaining the orientation of the chips whereby the apex corners point in the direction of travel by guiding an edge of the chip on one side of the apes corner; and causing the chips to become stacked automatically by causing the apex corner of one chip in the succession to slide over the base edge of the preceding chip in the succession such that the chips automatically slide into a stacked, nested arrangement.

2. The method of claim 1, wherein before the chips are caused to be oriented such that the apex corners point in the direction of travel they are transported with their apex corners pointing in a direction generally perpendicular to the direction of travel.

3. The method of claim 2, wherein the chips are caused to by oriented such that the apex corners point in the direction of travel by being rotated in a plane by approximately 120°.

4. The method of claim 2, wherein the chips are transported by a first conveyor while their apex corners are pointing in the direction generally perpendicular to the direction of travel and wherein the chips are caused to be oriented such that their apex corners point in the direction of travel by sliding down a J-slide from said first conveyor to a second, accumulator conveyor.

5. The method of claim 2, wherein the chips are transported by a first conveyor while their apex corners are pointing in the direction generally perpendicular to the direction of travel and wherein the chips are caused to be oriented such that their apex corners point in the direction of travel by tumbling over an end of said first conveyor onto a second, accumulator conveyor.

6. A method of segregating for subsequent packaging a succession of generally triangular chips, each of the chips being curved about a line extending parallel to a first, base edge of the chip and having an upturned apex corner opposite the base edge, the apex corners of some of the chips in the succession pointing in generally one direction and the apex corners of the other chips in the succession pointing in generally the opposite direction, said method comprising:

transporting the chips in a direction of travel;

causing the chips to be oriented such that the line about which each chip is curved is substantially parallel to the direction of travel;

causing the chips to move laterally relative to the direction of travel such that their centers of gravity become generally aligned, the base edges of the chips pointing in one direction become generally aligned with each other, and the base edges of the chips pointing in the opposite direction become generally aligned with each other, whereby the apex corners of the chips pointing in one direction extend laterally beyond the base edges of the chips facing in the opposite direction and vice-versa; and separating the succession of chips into two separate conveyor troughs by tripping or partially flipping the chips by means of their apex corners, with the chips pointing in one direction going to one conveyor trough and the chips pointing in the other direction going to the other conveyer trough.

7. The method of claim 6, wherein the chips are transported along the bottom of a vibratory U-shaped chute and the chips are caused to move laterally relative to the direction of travel such that their centers of gravity become generally aligned, the base edges of the chips pointing in one direction become generally aligned with each other, and the base edges of the chips pointing in the opposite direction become generally aligned with each other by means of vibrating the U-shaped chute.

8. The method of claim 6, wherein the two separate conveyor troughs are provided by means of a W-shaped chute having a vertex and wherein the chips are partially flipped so as to fall over the vertex and into one trough or the other.

9. The method of claim 6, wherein the chips are transported along the bottom of a vibratory U-shaped chute and the chips are caused to move laterally relative to the direction of travel such that their centers of gravity become generally aligned, the base edges of the chips pointing in one direction become generally aligned with each other, and the base edges of the chips pointing in the opposite direction become generally aligned with each other by means of vibrating the U-shaped chute;

wherein the two separate conveyor troughs are provided by means of a W-shaped chute that is aligned with the U-shaped chute, is disposed generally below an end of the U-shaped chute, and has a vertex; and wherein the chips are tripped or partially flipped so as to fall over the vertex and into one trough or the other by means of a pair of fingers extending from an end of the U-shaped chute.

10. A method of segregating and stacking for subsequent packaging a succession of curved, generally triangular chips, each of the chips being curved about a line extending parallel to a first, base edge of the chip and having an upturned apex corner opposite the base edge, the apex corners of some of the chips in the succession pointing in generally one direction and the apex corners of the other chips in the succession pointing in generally the opposite direction, said method comprising:

transporting the chips in a direction of travel;

causing the chips to be oriented such that the line about which each chip is curved is substantially parallel to the direction of travel;

causing the chips to move laterally relative to the direction of travel such that their centers of gravity become generally aligned, the base edges of the chips pointing in one direction become generally aligned with each other, and the base edges of the chips pointing in the opposite direction become generally aligned with each other, whereby the apex corners of the chips pointing in one direction extend laterally beyond the base edges of the chips facing in the opposite direction and vice-versa;

separating the succession of chips into two conveyor troughs by tripping or partially flipping the chips by means of their apex corners, with the chips pointing in one direction going to one conveyor trough and the chips pointing in the other direction going to the other conveyer trough;

while continuing to transport the chips in two successions by means of said conveyor troughs, causing the chips to be oriented such that the apex corners point in the direction of travel; and causing the chips in the two successions to become stacked automatically by causing the apex corner of one chip in each of the two successions to slide over the base edge of the preceding chip in each of the two successions such that the chips automatically slide into a stacked, nested arrangement.

\* \* \* \* \*